United States Patent [19]

McLaughlin

[11] 3,808,374

[45] Apr. 30, 1974

[54] TAPE UNIT RESPONSE CHECK CIRCUIT

[75] Inventor: Donald W. McLaughlin, Bolingbrook, Ill.

[73] Assignee: GTE Automatic Electric Laboratories Incorporated, Northlake, Ill.

[22] Filed: Dec. 13, 1972

[21] Appl. No.: 314,891

[52] U.S. Cl. ................................ 179/8 A, 179/7 R

[51] Int. Cl. ......................................... H04m 15/26

[58] Field of Search........... 179/8 A, 7 MM, 7.1 TP, 179/8

[56] References Cited

UNITED STATES PATENTS 3,075,046 1/1963 Nervik ............................... 179/8 A

*Primary Examiner*—Kathleen H. Claffy

*Assistant Examiner*—Gerald Brigance

*Attorney, Agent, or Firm*—Robert J. Black

[57] ABSTRACT

Traffic supervisory equipment for use in a telephone communication system adapted to record call switching data. Included is a tape recording response checking circuit that verifies that data has been recorded on an associated tape unit.

2 Claims, 4 Drawing Figures

TAPE UNIT
RESPONSE CHECK CIRCUIT

TAPE UNIT
RESPONSE CHECK CIRCUIT

TAPE UNIT RESPONSE CHECK CIRCUIT

BACKGROUND OF THE INVENTION

1. Field of the Invention

This invention relates to traffic supervisory facilities for use in a telephone communication system and more particularly to a system for recording called switching data that includes a tape unit response check circuit that verifies that the data is recorded on an associated tape unit and that the proper response is returned for each command given to the tape unit.

Facilities that provide administrative, engineering, maintenance and statistical information regarding the service and load conditions of a telephone office are becoming an ever important portion of modern telecommunication systems. In systems of this type certain pertinent data on the operation of the switching system is printed out and displayed at a maintenance control center. Additional information such as traffic data that is not required for on-line maintenance and management of the switching system and its network is usually outputed on computer compatible perforated paper and/or magnetic tape. This information is then a convenient format for processing by a computer.

2. Description of the Prior Art

It has been quite common in telephone communication systems to provide at the telephone central offices traffic register equipment. This equipment usually consisting of traffic registers and counters (peg count meters, etc.) providing facilities for obtaining information about call busy attempts, group busy partial digits, traffic usage, position disconnect and answering time registration as well as other miscellaneous data on the various circuits in the office. This equipment usually mounted in relay racks provides individual indications relative to the associated circuits. Usually no recording of the figures on the various meters and counters was included, however, occasionally facilities for photographing the information was provided.

Included in more contemporary telecommunication systems are devices known as traffic usage recorders to provide traffic data by means of the switch count method. Test terminals of the circuits being studied are usually scanned at predetermined intervals and those found busy are recorded on registers for the various circuit groups with accumulated busys at the end of an hour or other predetermined period indicating the traffic load that was carried in terms of hundred call seconds. The test leads for circuits being measured are usually connected through contacts of scanning switches to output detector circuitry. The detector circuits are then connected through contacts of register switches and a register terminal grouping to registers assigned for the test leads. Associated with such traffic usage recorders may be a control panel which when equipped with appropriate optional equipment may serve several traffic recorder frames. It also permits operating personnel to operate the traffic recorder's equipment on automatic or manual basis at different times.

Included in the Crossbar Tandem System manufactured by Western Electric Company is a traffic usage recorder employed as a measuring facility to obtain traffic load information on trunks, links, senders and markers. Similar to the manner described above the traffic load is measured by making repeated scannings of the busy test terminals of the circuits under study. The quantities determined as busys are added accumulatively. Likewise similar equipment is provided with the Type 4 Switching Systems also manufactured by Western Electric Company.

SUMMARY OF THE INVENTION

The present invention is drawn to a call switching data recorder and as such is included in those facilities that provide the necessary administrative, engineering, maintenance and statistical information regarding the service and load conditions of a tandem telephone switching office such as that designated No. 1 XPT as manufactured by GTE Automatic Electric Incorporated. Included in such equipment are keys, lamps and other devices to permit regulating the flow of traffic during periods of peak and excessive traffic loads. Normally the traffic recording and traffic management equipment described is located in a traffic or network administrative office or area. In a telephone system for which the present invention is intended call switching and similar pertinent data is transmitted to a data store buffer. In this location the data is stored while the markers continue normal operation. Once stored the data will be recorded on magnetic tape by an incremental tape recorder and later analyzed by computer. Due to the buffer storage technique, the system markers can go on to another call while data is being transferred from the buffer to the tape recorder and there is no increase in marker holding time. The selection of storage frequency and time length of recording intervals is under control of the associated traffic control console that is utilized in connection with the present invention.

In the communication system which the present invention is a part each marker will signal that data is ready while it is releasing from the associated register sender and matrix. If appropriate conditions and controls are in a true or operable condition the data will be stored into the buffer parallely usually in a two out of five code. At this time the following information is available on per call basis from each marker:

Four digits representative of the inlet identity (equipment location, the incoming trunk involved in the call).

The outlet identity consisting of four digits (giving the equipment location of the outgoing trunks selected for the call).

The called office and/or area codes in the form of three or six digits.

The marker identity consisting of one digit.

At the traffic control console associated with the present system equipment is provided that permits the following:

Selection of length and time of recording interval. Eight intervals are available, fifteen minutes, thirty minutes, one hour, two hours, four hours, eight hours, twelve hours and twenty-four hours. The recording time will begin only at the quarter hour as decoded from a real time clock.

Selection of rate of data storage. Three modes of storage rates are available. A continuous or maximum mode which records the data continuously as it occurs but is limited by some traffic level due to the speed of associated recording equipment. A one out of ten, and one out of one hundred mode respectively to record every tenth or hundredth call.

Initiation of recording at the next quarter hour. Recording continues for a selected time and automatically stops once the time is reached.

Operation to halt recording before the end of a selected recording interval has occurred. Stop time is recorded as the turnoff occurs.

Indication that the tape unit is recording call switching data as calls occur through the switching system.

Indication that one or more trouble conditions such as broken tape, end of tape, loss of clock pulses, power failure, etc. are present. The data to be recorded on the tape includes fifteen digits of call switching data for the marker along with two digits (tens and units) which give the count of calls processed by the markers since the last data was loaded. This count will be ten and one hundred in the one out of ten and the one out of one hundred modes respectively and will vary from one integer in the maximum mode.

Recording of stop and start times is loaded at the beginning and end of each tape data block. Also the time will appear at every 1 minute interval. Thus the actual calls processed by the marker for each minute are also recorded.

The local control panel provides for local control to supplement the normal remote controls included in the traffic control console referred to above. The local control panel functions as a maintenance aid by providing ready access and control to the switching system by virture of its facility for being located at many points within the switching system where easy access to equipment is provided. This ease is facilitated by virtue of the present local control panel being mounted on a printed circuit card and connectable into standard connectors available throughout the frames and racks of the telephone switching system. The local control panel besides duplicating the normal controls provides for transfer control interlock to guard against dual controls being initiated at both the traffic control console and the local control panel.

As indicated previously the called switching data recorder records information about calls processed by the markers on a sample basis. This information includes various sampling rates (3) and intervals of time (8). The sampling rate is recorded with each data word and real time is also recorded with the data in minute intervals. The recording is done using a one word buffer to allow for extracting data from the markers without affecting them. The data is then being recorded on magnetic tape via an incremental tape recorder. The normal controls of the call switching data recorder as indicated are included in the traffic control console.

During normal operation of the call switching data recorder it is operated to prepare the tape unit for recording (load tape and manually achieve the ready mode using the controls on the tape unit). The mode is then selected and recording time intervals selected and the start switch depressed. The recorder permits recording to begin only at quarter hour intervals, so that at the next fifteen minute mark the call switching data recorder will operate providing appropriate indication at the traffic control console and recording will begin. This will continue until the selected time has occurred. Clock pulses are counted and compared to the selected interval and when they agree, a stop sequence will be generated. The start switch is released after the "on" lamp comes on or else the call switching data recorder will again come on after the stop sequence. Any fault of course will cause the trouble lamp at the traffic control console to light and stop the recording. Operation of the interrupt switch will generate the stop sequence by generating a false selected time.

Included in the present system is circuitry to check the responses from the incremental tape unit. As indicated previously the call switching data recorder, records calls processed by the marker subsystems on a sample basis. As noted this includes various sampling rates and intervals of time. The sampling rate is recorded with each data word and the real time is also recorded with the data in minute intervals. As noted the recording is done using a one word buffer to allow for extracting data from the markers without affecting them. Data is then recorded on magnetic tape via an incremental tape recorder.

Operation of the tape unit is such that when a command to increment and write (step/write) is given, the data on the data line will then be written into the tape unit. Tape gaps (inter-record gaps) are also written on command. It is necessary that tape unit operation be verified with the tape unit continuously responding to such commands before the next command is given.

In the present call switching data recorder the verification technique employed assumes that a fault is always present, which is then overridden by a correct response, rather than looking for a correct response and if it doesn't occur indicate a failure. In the present system when a command is given to the tape unit a latch is set which is part of the trouble indicator circuitry and will operate to disable the advance to the next operation. The response occurring actually resets this latch and removes the trouble indication and the disable. A blanking of the trouble signal limits the actual alarm to allow the tape unit to respond. This is to say in the present system that a technique of "guilty until proven innocent" is employed as a method of checking for errors. This also permits checking faulty testing detection logic dynamically. Usually a fault must be introduced to verify the fault detection logic has not failed in the "no failure" mode.

DESCRIPTION OF THE PREFERRED EMBODIMENT

Figure 1:
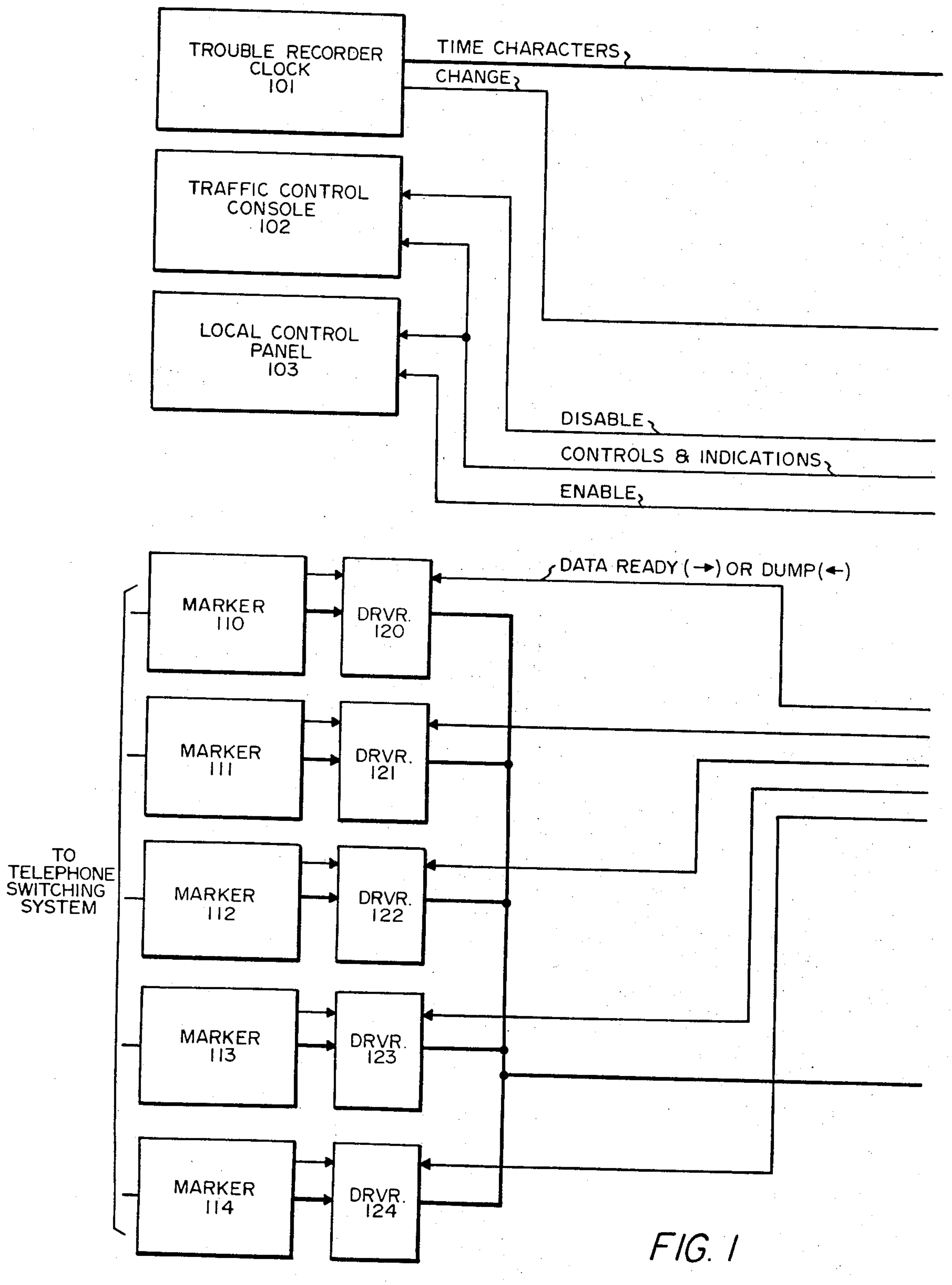
FIGS. 1, 2 and 3, taken in combination, with FIG. 1 placed to the left of FIG. 2 and FIG. 3 to the right of FIG. 2, constitute a block diagram of a call switching data recorder in accordance with the present invention.

Referring now to the circuit block diagram (FIGS. 1, 2 & 3 in combination), those circuits which provide connection to the call switching data recorder system, but do not form a portion of it include, the trouble recorder 101 (specifically the trouble recorder clock circuitry) the traffic control console 102 (which includes controls for the call switching data recorder) and the markers 110 to 114 included in the telecommunication system. Included as portions of the call switching data recorder are the local control panel 103 which provides local controls for the call switching data recorder, five traffic measurement access circuits 120 to 124 which provide the inlet facility to the call switching data recorder for information from the markers, a marker data accumulator 250, magnetic tape control circuitry 200, magnetic tape write circuitry 300 and the incremental magnetic tape unit 390 which in a preferred embodiment of the present invention consists of a unit for recording on nine track magnetic tape 399 as manufactured by Cipher Data Products Model No. 100H, the output of which provides nine track coded information at an 800 bit per inch rate.

As shown in the block diagram data flow is indicated by heavier lines basic data information being derived from the markers through the traffic measurement access to the marker data accumulator 250 and transmitted from there to the magnetic tape write circuitry 300 where it is combined with information from the trouble recorder clock 101 which is taken through the magnetic tape control circuitry 200 with the ultimate information going through the magnetic tape write circuit to the incremetal tape recorder 390.

The trouble recorder clock circuit 101 which does not form a portion of the present invention, provides signals periodically to be sent to the call switching data recorder in a two out of five code on a parallel basis. The change signal is also sent to disable decoding in the call switching data recorder during time changes. This signal is about five seconds long and occurs every minute. The clock circuitry operates on a 24 hour basis.

As noted previously the traffic control console is usually located in the traffic room separate from the switching equipment and the equipment of the call switching data recorder and contains controls for the call switching data recorder as previously described.

The five traffic measurement access circuits 120 to 124, each shown connected between an associated marker and the marker data accumulator 250 are provided on a one per marker basis and are mounted within the associated marker frame. These units provide the principal interface to the call switching data recorder and operate in response to a "data ready signal" from the associated marker and a "dump" signal from the call switching data recording equipment to permit the gating of the marker's call switching data to the marker data accumulator 250. Information is transmitted then from the traffic measurement access equipment by means of relay driver circuitry 120 to 124 on a parallel basis in two out of five code.

The marker data accumulator circuitry 250 allows for storage of the marker call switching data received via the data highway which is multiplied to each of the traffic measurement access circuits. The marker data accumulator includes: receiver circuitry 251 connected to the markers, relay circuitry to receive the data 252, data storage latches 254, data ready counter circuitry 253, (a free running counter for pulse generation) and the buffer control logic 255.

The magnetic tape control circuitry 200 controls all the operations to be performed by the call switching data recorder. It includes clock pulse generating circuitry 206, clock signal detector 201, time storage latches 202, start stop logic 204, a fifteen minute timer and counter 203, tape control logic 205, and provides for buffering of the manual 390. As noted previously, the tape unit is an incremental magnetic tape unit manufactured by Cipher Data control console as well as tape control logic. location The magnetic tape write circuitry 300 transfers data to the tape in binary code and consists of data steering gates 302, a digit counter 303, a two out of five binary code converter 305, the tape write control logic circuitry 301 and the "write" interface logic 304 to the incremental magnetic tape unit manufactured by Cipher Data Products and can write data on the order of a thousand characters per second. The unit includes a manual data entry feature for recording the data site locaion or other identifying information onto the beginning of each tape reel.

Figure 2:
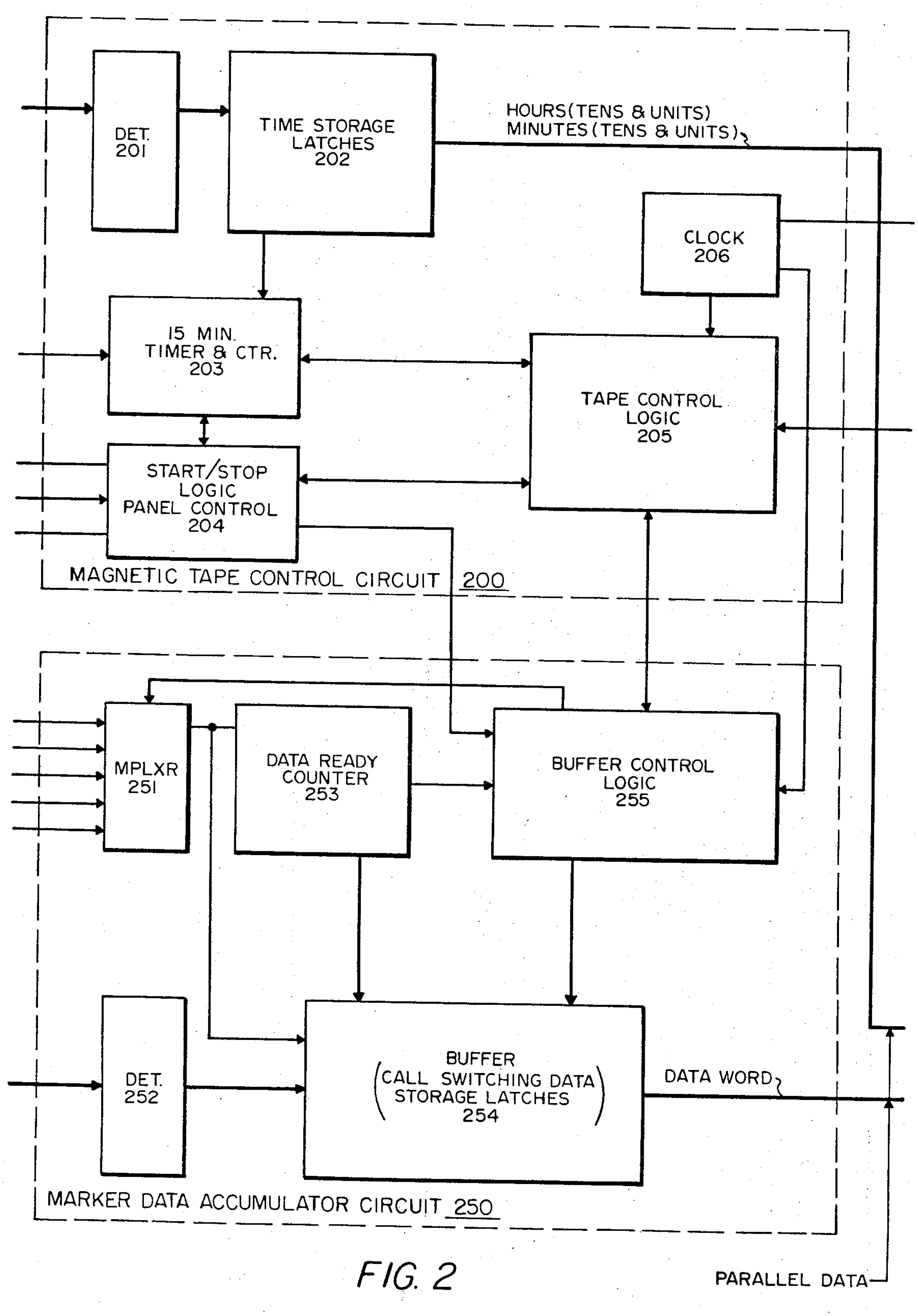
Figure 3:
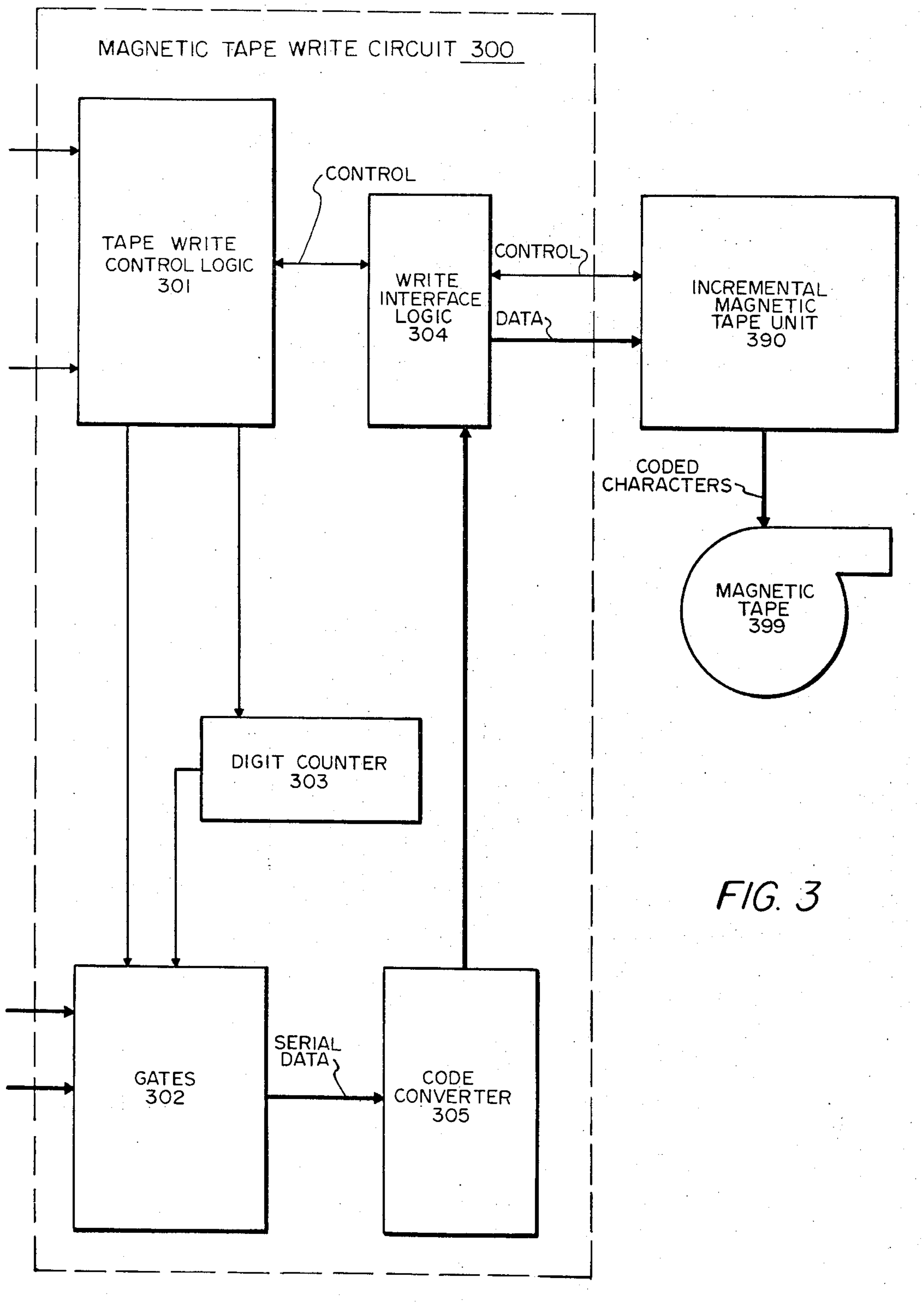

A better understanding of the present invention and particularly the operation of the call switching data recorder may be had from the following description of a typical 1 hour recording interval wherein reference is made to the block diagram of FIGS. 1, 2 and 3.

It should be noted, however, that the blocks referenced in the drawings are described in terms of their particular functional operation. The detailed circuitry in most cases may be implemented in several ways and as such does not form a portion of the present invention, unless the circuit details are presented.

Throughout the following description reference will be made to the operation of various latch circuits. The location of the principal latch circuits are as follows:

| LATCH NAME | LOCATION |
|---|---|
| START | TAPE CONTROL LOGIC 205 |
| LOAD TIME | TAPE CONTROL LOGIC 205 |
| TAPE BUSY | TAPE CONTROL LOGIC 205 |
| SHORT | TAPE CONTROL LOGIC 205 |
| TAPE DONE | TAPE CONTROL LOGIC 205 |
| HAVE LOADED TIME | TAPE CONTROL LOGIC 205 |
| BUFFER BUSY | BUFFER CONTROL LOGIC 255 |
| HAVE LOADED BUFFER | BUFFER CONTROL LOGIC 255 |
| WRITE A | TAPE WRITE CONTROL LOGIC 301 |

Each of the latches is a similar logic circuit having two inputs (Set and Reset) and two outputs (1 and 0). Each latch operates and stays operated in the mode determined by the last received input signal.

Assume initially that all circuitry of the present invention is in its off and reset condition. The length of the recording interval will be selected (assume a one hour recording), and the mode of recording data is also selected (as shown the maximum mode). The start key is placed in the on position at 12:21. At 12:30 (the next fifteen minute increment) as decoded from the clock circuitry of the trouble recorder 101, a start latch will be set. The 15 minute timer and counter 203 will be enabled, a load time latch will be set and recording may begin. Since the tape is idle, the start time (12:30) is recorded on the tape. In the meantime a tape busy latch will inhibit data from being loaded onto the tape until the "start time" is loaded. It should be noted however that data may be loaded into the buffer 254 at this time. Once loaded a "tape done" latch will be set. On the next clock pulse the "load time" latch the tape busy latch and the tape done latch will be reset, the have loaded time latch sets to keep from continually storing the time and the tape unit 390 is available for data storage from the buffer since the "stop" condition is not true or present. The "have loaded time" latch will be reset when the clock advances off 12:30.

As soon as the marker completes a call and begins to release it will send a signal saying data is ready. This signal also advances the data ready counter 253. Since the maximum mode was selected and the buffer 254 is idle the buffer busy latch will be set to transfer the marker call switching data to the buffer along with the marker's identity. It is assumed for purposes of description that marker 112 will be the reporting marker.

A data ready count (a count of one since this is the first call of recording sequence), is also stored in the buffer 254 and then the counter 253 will be reset. The "buffer busy" latch will keep other markers from storing data while this data is being recorded on the tape 399. The tape unit 390 is idle so now a tape busy condition will be set and the data stored in the buffer will be recorded serially by digit onto the tape. When recording is completed a "tape done" latch will be set and the buffer 254 will be reset along with the tape busy latch. The tape unit and the data buffer again are in their idle conditions.

Note that if while the data from marker 112 was being stored on the tape, another marker (for example marker 111) had sent a data ready signal, it would increment the counter 253 to one but no data would be loaded. Now when data is again ready say from marker 113, the counter 253 would be advanced to two and this data would be stored since the buffer 254 was reset after marker 111's data was stored on the tape. The count of two would also be stored in the buffer indicating this is the second call since the last data storage. The marker identity of marker 113 is also stored in the buffer. Thus data is continuously stored in this way; those calls occurring while the buffer is busy are recorded by the counter so that figure for the total calls processed and relative occurrence rate are available with the actual call switching data and associated marker identity.

At 12:31 the one minute timing will set the "load time" latch as in the start operation, but the fifteen minute counter 203 is not advanced since the 15 minute mark is not present. This time is stored on the tape as before. This one minute condition will occur every minute from 12:32 through 12:44. At 12:45 fifteen minutes of recording have elapsed and the 15 minute time is loaded using the load time latch as before. The 15 minute counter was advanced to a count of one indicating the elapsed recording time. The counter time does not equal the selected time which would be a count of 4 or 60 minutes for the present example. When the tape unit 390 next becomes idle, the 15 minute time (12:45) is loaded onto the tape while tape busy setting keeps the buffer waiting if it is also loaded again. Once the time (12:45) is loaded, make busy will be reset along with the other latches if the tape unit is available for data storage from the buffer. At 1:00 and 1:15 the counter 203 will advance to 2 and 3 respectively. The time will also be loaded every minute. At 1:30 the counter is advanced to 4 and now the selected time and counter agree so the stop latch will be set which will set the load time latch. If the tape is busy that data will be loaded completely but the buffer can no longer be loaded by any marker since the stop signal is present. When the tape unit 390 is idle the tape busy latch will be set and the stop time (1:30) will be loaded onto the shape. tape. tape done latch will then be set and everything will be reset. The entire system will then return to idle.

Operation for use in the one out of ten mode and the one out of one hundred mode is the same except that the call ready counter must be at the ten or one hundred counts respectively before the buffer is stored with the marker's data. In these modes the case of no data being stored because the buffer is busy would never occur.

In magnetic tape control circuitry 200 logic operation will be described in the following. For the turn on operation, the first one minute mark (with the counter still at zero count), the 15 minute mark and the turn off operation.

Once the tape unit 390 is prepared to receive data and the desired length of the recording interval and mode are selected at the traffic control console 102 the start switch will be operated to its on position. The start signal will go to its true condition but it should be assumed that we are not at this time decoding a particular 15 minute time. For example it may be at 1 minute to the hour. The trouble recorder clock 101 will send the change signal as it changes the time by 1 minute. The change latch will be set and the time latch reset disabling the 15 minute pulse decode. After about five seconds the change signal will go away but since the trouble recorder decode is still not clear the timer 203 will be enabled as a result of the change latch resetting. An "L signal" will be submitted which indicates the timer 203 is running. As the timer finishes a "P pulse" will be given and the L pulse stopped. A time latch will be set from the P signal along with the loading of the trouble recorder signals into the time latches 202 (the load time signals LTSP and LTRP).

Since the time is on the hour the fifteen minute pulse will come true. This will set the start latch which enables the time counter 203 and the data ready counter 253. The load time latch will now set, in turn setting the short latch and tape busy latch. This condition will place a demand on the tape unit 390 to load the four time characters stored in the time latches. Once this is complete via the magnetic tape write operation, the tape done latch will set in turn resetting the load time latch, the short latch, the tape busy latch, tape done latch, digit counter and set the have loaded time latch. When a change again occurs the operation to load the new time will be the same as before resulting in 1 minute after the hour being stored. This will cause the 15 minute pulse to be removed and the have loaded time latch will reset. It should be noted that once the start latch sets as evidenced at the traffic control console by an on lamp indication, the start toggle switch may be turned off.

On the occasion of the first one minute mark no action occurs in the magnetic tape control circuit 200 unless the change signal comes true from the trouble recorder clock 101 (except the tape busy and the tape done latches due to the marker data accumulator operation). With the occurrence of the change signal disappearing the time latch will be set with the timer "P signal" along with the storage of the trouble recorder time onto the time latch.

The load time latch, short latch and tape busy latch will now set and the time will be loaded via the magnetic tape write circuit 300 operation. Once the magnetic tape write operation is completed the tape done latch will set. This in turn resets the load time latch, short latch, tape busy latch, tape done latch and digit counter and sets the have loaded time latch. The have loaded time latch is then reset with the resetting of the time latch during the next time change.

The fifteenth change signal results in the time being loaded as before but now the decoded time is such that the fifteenth minute pulse occurs. This advances the time counter 203 from the zero count (no advance when start is set since the counter is not enabled yet) to the one count. Assume we have selected a four hour recording interval so the selected time occurred signal (STO) does not come true. Again the latches are set as previously described followed by the tape done sequence. The counter 203 will advance every 15 minutes for the two through nine counts and those respective times will be loaded onto the tape 399 due to the magnetic tape write circuit 300 operation to be described below. However, when the count of nine occurred the carry latch was also set. Now when the next 15 minute pulse occurs the counter tens and units latches are advanced to give a count of 10. This decode resets the carry latch so only the units latch will be advanced on the next pulse. Again the time is stored on the tape.

As the sixteenth fifteen minute pulse occurs the counter 203 will advance to a count of 16 and set the load time latches before. Now since we are in a four hour recording interval, the selected time occurred signal (STO) will come true. This will reset the start latch. The time counter enabling signal will be removed and the reset occurs along with the reset to remove the enable signal to the data ready counter 253. The marker data accumulator circuit 250 is also disabled since the load data signal is also disabled. The count will not be zero and the stop time will be loaded via the magnetic tape write circuit 300 operation as before. When this is completed the tape done latch will cause the reset operation as before and the call switching data recorder will return to its off condition. The off condition is evidenced by the on lamp at the trouble control console being extinguished. With the next change signal the "have loaded" time latch will be reset. Note that if the start toggle switch has not been placed in the off condition another four hour recording interval will begin.

The logical operation of the marker data accumulator circuitry 250 will be described for the following situations: Missed storing of data from marker 110 since the call switching data recorder is off while storing data from marker 114 and missed storing of data from marker 110 since the buffer is busy due to marker 114's data. The mode will be maximum. The second case will be that of storage of data from marker 110 and the data ready counter going from nine to 10 with the missing of storing data from marker 114 and then 110. Since the data ready counter is now at ten the mode will be that of one in ten. The final case will be recording of data from marker 114 while recording (the stop latches set), but after the data stored signal comes true and missing the storing of data from marker 110 since the call switching data recorder is at its off condition. This latter case will involve operation in the maximum mode.

In the first case the data ready signal will be generated in marker 110. This will set the data ready latch associated with marker 110. On the next P1 pulse the advance count signal will be sent to the data ready counter 253. Since the call switching data recorder is off the counter will not advance and will remain in its reset state. The dump signal does not occur since the load data signal is inhibited until the call switching data recorder is turned on. Since no data is loaded a set buffer busy pulse will also be blocked. On the first P1 pulse after marker 0 removes the data ready signal its data ready latch will be reset. The call switching data recorder will now be on due to the magnetic tape control circuitry 200 operation.

The data ready signal occurs from marker 114 and on the first P13 pulse its data ready latch will be set. This will generate the advance count pulse which steps the data ready counter 253 from zero to one indicating a call has occurred since the recorder was on. The P14 pulse will generate the dump signal to marker 114. Since the load data signal is true and we are in the maximum mode the dump signal starts the counter 253 and locks the pulse counter on the P14 pulse to permit the data relays 124 to operate. Once the delay counter reaches a count of three, a slow clock pulse A and a fast clock pulse B occur together and the delay latch will be set. This permits the pulse counter to advance on the next pulse and generates the storage enable pulses to store the call switching data from marker 114 into the buffer data latches 254. The data ready count of one is also stored in the buffer data latches. The pulse counter advancing off a pulse count of 14 will turn off the dump signal. The fifteenth pulse and the the data storage signal generate the buffer busy signal which will set the buffer busy latch and reset the data ready counter 253. The buffer busy signal will set the tape busy latch which will send a demand to load the data to the magnetic tape write circuit 300.

Once the data is loaded the tape done latch will be set which will cause the tape busy, the tape done and the digit counter to reset while the have loaded buffer latch will set. This will generate the storage reset pulses to reset the buffer until the data stored signal goes away. Then on the sixteenth pulse the buffer busy and have loaded buffer latches will reset. It should be noted that the data ready signal for marker 110 occurring while marker 114's data was being loaded, advanced the data ready counter 253 from zero to one so when the next data is stored a count of two will be recorded.

In the second case, the recording mode is that of one in ten, meaning every tenth code is to be recorded. The counter 253 has been advanced to the count of nine which says that nine calls have been processed by the marker since either the last data word was recorded or the call switching data recorder was turned on. Now marker 110 sends the data ready signal and sets its data ready latch when a P1 pulse occurs. This advances the counter to ten and the load data signal is enabled. The carry latch is reset on the next A pulse and set with the count of nine. The P2 pulse generates the dump signal to marker 110, locks the pulse counter, and starts the delay counter. After the delay occurs the latch is set and the pulse counter enabled. The data from marker 110 is stored in the data latches 254 with the count of ten from the data ready counter 253.

The dump signal is now removed and the data storage signal will come true to allow the set buffer busy signal on the next P3 pulse. The buffer busy latch was set and set the tape busy latch. Note that the delay counter was reset by advancing to the zero count. After the magnetic tape write operation to be described below, the tape done latch will set and everything is reset as in the previous case.

Some time later the marker 114 followed by marker 110 data ready signals occur setting their respective latches. Each operation generates the advance count signal to step the data ready counter 253 from zero to one and then up to two but the load data signal is blocked since the unit's count of zero is false. The data stored signal being present keeps the buffer busy latch from setting. Operation of the one out of one hundred mode is similar to that outlined above.

In the final case referred to above the maximum mode is employed. Marker 114 will send a data ready signal and the usual storing of this data into the latches 254 occurs with the exception of the magnetic tape control circuit 200 operation, to reset the start latch just after data was stored in the buffer. If this occurred before the load data signal had allowed the delay latch to set, no data would be stored and the buffer busy latch would not set. Also the buffer busy latch, set the tape busy latch before the load time latch set so the magnetic tape write circuit 300 will handle this demand first. This race for the tape unit could occur whenever the load time latch sets except for the call switching data recorder "on" operation. In case of a tie the load time latch overrides the buffer busy latch since the short latch is allowed to set. This is done so that the 15 minute times will be written as soon as the next demand for the magnetic tape write circuit 300 is available. Going back to the present case, once the tape busy latch is reset due to the tape done operation, it is set again to load the stop time. When the data ready signal occurs for marker 110 no advance occurs since the counter is disabled by the stop latch (start not). Once the stop time was loaded the call switching data recorder is off.

The logical operation of the magnetic tape write circuit 300 will be described in connection with two cases. The first of these are a short load cycle. This loads the four time characters followed by an inter-record gap for the start time, all minute marks and the stop time. The other case will be a long load cycle. This loads the seventeen characters stored in the marker data accumulator buffer followed by an "AND" character (one call switching data word).

In the first case of a short load cycle, the tape done signal along with the short signal defines the short load cycle and results whenever the load time latch sets. The run signal indicates proper conditioning of the tape unit. Failure to have the run signal while the call switching data recorder is on lights the trouble lamp on the trouble control console panel. The digit counter 303 is at zero so the enable circuit comes true to allow advancing of the digit counter and enables the go signal. Assuming now that there is not a broken tape or gap in progress or busy mark in the tape unit. The go signal will enable the sequence counter which steps to a count of one, two and three. This advances the digit counter 303 to a count of one, loads the non-return to zero data latches and sends the step-write signal to the tape unit 390, respectively. The digit count of one along with the short signal gates the hours and tens time latches through the steering gates 303 in a two out of five code, to the binary conversion logic 305. This converts each digit to nine track IBM code and enables the four NRZ data latches which were allowed to change on the sequence counter count of two. The step-write signal to the tape unit 390 permits the data present on the eight data leads to be written onto the tape 399. The busy signal indicates that the tape unit is performing this function and its removal indicates it is done. Normally the go signal will come true before the next slow pulse "A" and the four time digits will be loaded 1.36 milliseconds apart. The count of five occurs when the sequence counter reaches a count of two the fifth time and disables the EN(B) signal and enables the short load done signal. The NRZ latches are reset since no data is gated through the steering gates 302 and the step-write signal is disabled while the inter-record gap signal is sent to the tape unit. The gap is written and is indicated by the gap in progress signal. The SLD signal sets the tape done latch and the reset occurs to ready the magnetic tape write circuitry 300 for the next request.

In the other case of a long load cycle, the tape done signal with a long signal (short not) defines the long load cycle and results whenever the buffer busy latch sets. The EN(A) signal enables the digit counter as it goes from zero to nine and the first nine characters of call switching data are written on the tape 399 as in the short mode cycle. At the count of nine the EN(A) signal is disabled and the EN(C) latch sets the digit counter 303 to step up to a count of eighten and the rest of the call switching data to be loaded onto the tape. The count of eighteen resets the EN(C) latch and no data is loaded into the NRZ latches via the steering gates 302. The write AND latch sets on sequence counter count of two and an AND character is written onto the tape. The eighteen count also enables the long load done signal to begin the reset signal by setting the tape done latch in the magnetic tape control circuit 200. Any of the enable signals EN(A), EN(B), or EN(C) allow the first four data lines to the tape unit to be enabled so that nine track IBM binary code is followed. The sequence counter is reset by allowing it to set to zero.

Figure 4:
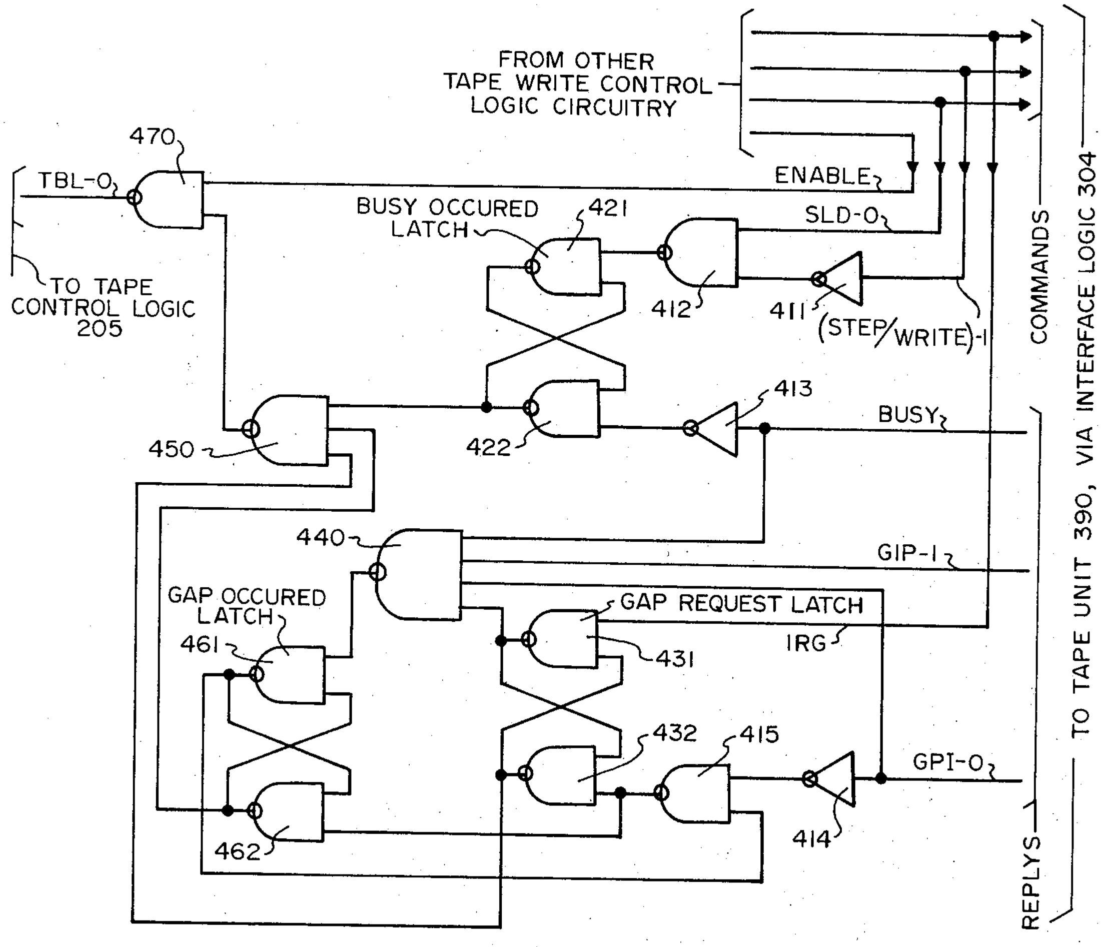
FIG. 4 is a logic diagram of the tape unit response check circuit employed in the present invention.

As noted previously one of the important features of the present system is the inclusion of a tape unit response check circuit to check proper responses from the incremental tape unit. Referring now to FIG. 4 the logic circuitry for the tape unit response check circuit is shown. The circuitry of FIG. 4 consists of three latch circuits, a busy occurred latch consisting of gates 421 and 422, a gap request latch consisting of gates 431 and 432, and a gap occurred latch consisting of gates 461 and 462. Additional gates 412, 415, 440, 450 and 470 as well as inverters 411, 413 and 414 are also included in the logic circuitry of FIG. 4.

The tape unit response check circuit of FIG. 4 is included in the tape write control logic 301 as shown in FIG. 3. However certain basic signals are derived from other portions of the tape write control logic circuitry including the enable signal, short load done (SLD) signal, count 2 signal and IRG signal. The step/write (count 2) and IRG signals are also extended from the tape write control logic circuitry 301 to the incremental tape unit 390 via the write interface logic 304, all as shown in FIG. 3. These signals function as commands to the tape unit. Responses from the tape unit 390 also come through the write interface logic 304 to the present response check circuit and include the busy signal, GIP-1 signal, and GPI-0 signal. The output of the tape unit response check circuit is a TBL-0 signal which is extended to the tape control logic 205 of FIG. 2.

The present tape unit response check circuit checks for two conditions. Referring now to FIG. 4 the step/-write signal must be followed by a busy signal from the tape unit 390 and then in absence of busy on the same lead within 1.35 milliseconds, to be operating properly. The other condition, an IRG command must be followed by a busy signal as above and also a GIP (gap in progress) signal followed by a GPI (gap completed indication) pulse. Since the second condition incorporates the operation of the first it will be described in the following reference to FIG. 4.

With the generation of the IRG signal on lead IRG the gap request latch consisting of gates 431 and 432 will be set. A gap request 0 signal from the gap request latch will cause a signal for application to the input of gate 470. However the enable signal will not be present at gate 470 preventing operation of gate 470 from producing a TBL-0 output. In the tape write control logic 301 a SLD-O signal will keep the count 2 lead from setting the busy occurred latch consisting of gates 421 and 422. If a busy occurs, that is a response from the tape unit when incrementing to either write data or generate a gap, it plus the GIP response from the tape unit if a gap is being generated, will set the gap occurred latch consisting of gates 461 and 462. This will allow for analysis of the trouble. The gap occurred latch also can generate a TBL-1 signal.

Later after the gap is generated, busy and GIP are no longer present, a GPI pulse will be generated by the tape unit. This will reset the two latches provided the second has been set. If the busy or GIP signal are not removed and either latch is set when an enable signal occurs from the logic circuitry of the tape write control, trouble is indicated and the next advance will be inhibited.

While but a single embodiment of the present invention has been described, it will be obvious to those skilled in the art that numerous modifications of the present invention can be made without departing from the spirit and scope of the invention, which is limited only by the claims appended hereto.

What is claimed is:

1. For use in a telephone system data recording subsystem, a source of logic control signals, recording means, and a recording unit verification circuit connected therebetween, said verification circuit comprising: first, second and third latch circuits each having first and second inputs and at least a first output; first gating means including a pair of input circuit connections connected to said source of logic control signals and an output connected to said first latch first input, operated in response to two different input signals to generate an output signal for operation of said first latch, a circuit connection from said recording means connected to said first latch second input to reset said first latch circuit; second gating means, output gating means including input circuit connections from said source of logic control signals and from the output of said second gating means, the output of said output gating means connected to said source of logic control signals; said second gating means including a plurality of input circuits, said plurality of input circuits including a circuit connection to the output of said first latch circuit; and third gating means; said second latch circuit first input connected to said source of logic control signals and said second latch second input connected to the output of said third gating means; said third gating means including a first input connected to said recording means and a second input connected to a second output on said third latch; said first output of said second latch circuit connected to one of said plurality of inputs included in said second gating means.

2. For use in a telephone system data recording subsystem, a recording unit verification circuit as claimed in claim 1 wherein: there is further included fourth gating means including a plurality of inputs, a portion of said plurality of inputs connected to said recording unit and at least one of said inputs connected to a second output associated with said second latch circuit; said fourth gating means including an output circuit connection to said first circuit input associated with said third latch circuit; said second input associated with said third latch circuit connected to the output of said third gating means and first output circuit associated with said third latch circuit connected to the input of said second gating means.

* * * * *